United States Patent
Mita et al.

(10) Patent No.: US 7,832,271 B2
(45) Date of Patent: Nov. 16, 2010

(54) GYROSCOPE

(75) Inventors: Makoko Mita, Kanagawa (JP);
Hirobumi Saito, Kanagawa (JP);
Hiroshi Toshiyoshi, Kanagawa (JP)

(73) Assignee: Japan Aerospace Exploration Agency, Tokyo (JP)

( * ) Notice: Subject to any disclaimer, the term of this patent is extended or adjusted under 35 U.S.C. 154(b) by 296 days.

(21) Appl. No.: 11/914,127

(22) PCT Filed: May 24, 2005

(86) PCT No.: PCT/JP2005/009424
§ 371 (c)(1),
(2), (4) Date: Nov. 9, 2007

(87) PCT Pub. No.: WO2006/126253
PCT Pub. Date: Nov. 30, 2006

(65) Prior Publication Data
US 2009/0090200 A1    Apr. 9, 2009

(51) Int. Cl.
G01P 9/04    (2006.01)
(52) U.S. Cl. ............... 73/504.12; 73/504.04; 73/504.14
(58) Field of Classification Search ............. 73/504.04, 73/504.12, 504.13, 504.14, 504.16, 504.02
See application file for complete search history.

(56) References Cited

U.S. PATENT DOCUMENTS 6,321,598 B1    11/2001    Iwaki et al.
7,043,987 B2 *  5/2006     Jeong et al. ............... 73/504.12
7,100,446 B1 *  9/2006     Acar et al. ................ 73/504.13
7,284,408 B2 * 10/2007     Kato ........................ 73/1.37
7,284,429 B2 * 10/2007     Chaumet et al. ......... 73/504.12
2005/0066726 A1  3/2005    Mochida

FOREIGN PATENT DOCUMENTS

JP    2000-329562    11/2000
JP    2005-106550    4/2005

OTHER PUBLICATIONS

Acar, Cenk, et al. "Enhancement of Drive-Mode Bandwidth in MEMS Vibratory Gyroscopes Utilizing Multiple Oscillators," Solid-State Sensor, Actuator and Microsystems Workshop, Jun. 6-10, 2004, pp. 368-371, Hilton Head Island, So. Carolina.

* cited by examiner

*Primary Examiner*—Helen C. Kwok
(74) *Attorney, Agent, or Firm*—Blakely, Sokoloff, Taylor & Zafman LLP (57)    ABSTRACT

To provide a compact and high performance gyroscope.

A gyroscope (10) comprises an outer frame (11); an inner frame (12) positioned inside the outer frame and supported to be movable in one reciprocating direction; a plurality of proof masses (15) positioned inside the inner frame and supported to be movable in the direction orthogonal to the one reciprocating direction; a plurality of outer support suspensions (13) which connect the outer frame and the inner frame; a plurality of inner support suspensions (14) which connect the inner frame and each of the proof masses; actuators (16) for accelerating each of the proof masses; and detectors (17) for detecting displacement of the inner frame against the outer frame. The actuators oscillate the plurality of proof masses in-phase, and wherein Coriolis forces induced on each of the proof masses are summed up in the inner frame.

3 Claims, 10 Drawing Sheets

GYROSCOPE

CROSS-REFERENCE TO OTHER APPLICATIONS

This is a National Phase of International Application No. PCT/JP2005/009424, filed on May 24, 2005.

FIELD

The present invention relates to gyroscopes, and more specifically, relates to compact and high performance gyroscopes and a method for making the same.

BACKGROUND

In recent years, compact and high performance gyroscopes have been desired for spacecrafts operated in space.

Compact gyroscopes are also desired for navigation systems for automobiles, game machines and cameras.

Coriolis forces, used in gyroscopes, increase when mass and speed of proof masses increase. If smaller proof masses are used to downsize gyroscopes, masses decrease. In order to induce a large Coriolis force with small masses, proof masses have to be moved rapidly. However, the velocity of a proof mass is limited.

Therefore, the prior art gyroscope has the defect that if the gyroscope is downsized, sensitivity and stability are decreased.

Figure 1:
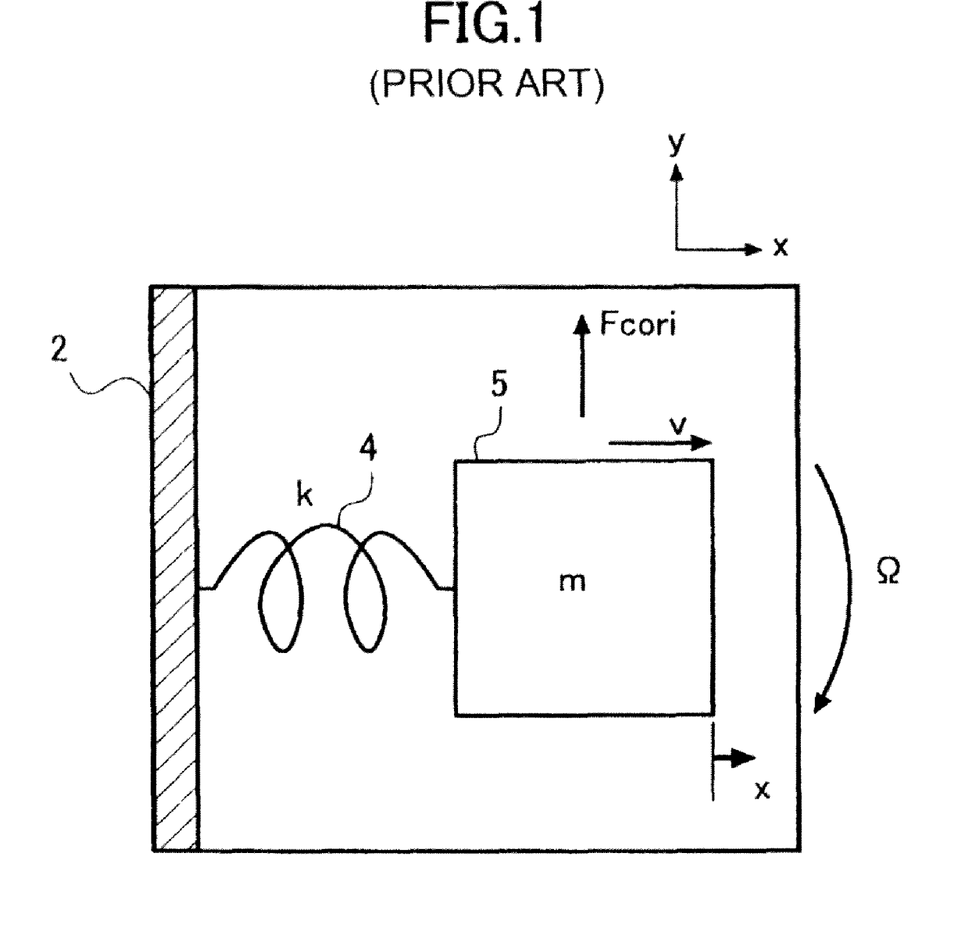
FIG. 1—A figure explaining Coriolis forces.

FIG. 1 is a figure explaining the Coriolis force. A proof mass 5 having a mass m is connected to a support frame 2 by a support suspension 4. The support suspension 4 is shown by a coil spring. When the proof mass 5 is driven in x-direction at a speed v, and this device is rotated at angular velocity $\Omega$, a Coriolis force $F_{cori}$ in y-direction is induced.

$$F_{cori}=2m\Omega v \quad (1)$$

As shown in equation (1), to induce a large Coriolis force, it is necessary to increase the mass m and velocity v of the proof mass 5.

When the proof mass 5 is driven at amplitude $x_0$ and angular frequency $\omega$, the displacement of the proof mass 5 is shown by the equation (2).

$$x=x_0 \sin(\omega t) \quad (2)$$

The displacement of the proof mass 5 is differentiated by time, then a velocity v(t) is obtained.

$$V(t)=dx/dt=x_0\omega \cos(\omega t) \quad (3)$$

Thus, the Coriolis force can be shown as follows.

$$F_{cori}=2m\Omega x_0 \omega \cos(\omega t) \quad (4)$$

When only amplitude is considered, $$F_{cori}=2m\Omega x_0 \omega \quad (5)$$

Thus, to induce a large Coriolis force, it is necessary to increase the mass m of the proof mass 5, and increase the amplitude and frequency.

In a mechanical oscillation system, the upper limit of driving frequency is resonance frequency of the system. At resonance frequency, it is expected that the amplitude is increased by factor Q. However, the distance that the mass can be moved is limited by the structure of the system, and thus the amplitude does not increase so much.

When the proof mass is driven at the resonance frequency (factor Q), the amplitude is sensitive to fluctuation of frequency, and thus stability is not obtained. Thus, in order to obtain stability, it is better to drive the proof mass at a frequency different from the resonance frequency.

It is assumed that the driving frequency is set to the resonance frequency. It is assumed that a model of a spring—mass system with a lumped constant is used, and spring constant of the suspension 4 is k. Then, the angular frequency $\omega_{res}$ is shown as follows.

$$\omega_{res}=\sqrt{(k/m)} \quad (6)$$

The equation (6) is assigned to the equation (5).

$$F_{cori}=2m\Omega x_0\sqrt{(k/m)}=2\Omega x_0\sqrt{(mk)} \quad (7)$$

Thus, the Coriolis force is proportional to the amplitude $x_0$, and is proportional to square root of spring constant k and mass m.

In the case of a micro gyroscope including a proof mass 5 with small mass m, when driving force of an actuator for driving the proof mass 5 increases, and the amplitude $x_0$ of the proof mass 5 increases, then a large Coriolis force is induced. That is, the sensitivity of the gyroscope increases. However, the amplitude $x_0$ is limited by the construction of the gyroscope.

Further, like the case when mass m is increased, when spring constant k is increased, a large Coriolis force is induced.

Prior art Patent Publication 1 discloses an oscillating gyroscope which is formed integrally by etching a silicon substrate.

This gyroscope has one oscillator, and a small Coriolis force is induced. Further, this gyroscope is made from one silicon substrate, and thus it is difficult to make a multilayer structure.

Therefore, a more compact and high performance gyroscope is desired, and a fabrication method for making such gyroscope is also desired.

Patent Publication 1: JP H05-209754

SUMMARY

An object of the present invention is to provide a compact and high performance gyroscope. Another object of the present invention is to provide a method for manufacturing such a gyroscope using a micro machining technique.

The gyroscope of the present invention has a plurality of proof masses, each proof mass is oscillated synchronously, and Coriolis forces induced on each of the proof masses are summed up or combined, thereby obtaining a Coriolis force larger than that obtained by oscillating one proof mass at high speed.

In one aspect of the present invention, a gyroscope comprises:

an outer frame;
an inner frame positioned inside said outer frame;
a plurality of proof masses positioned inside said inner frame;
a plurality of outer support suspensions which connect said outer frame and said inner frame and which support said inner frame so that it is movable in one reciprocating direction against said outer frame;
a plurality of inner support suspensions which connect said inner frame and each of said proof masses and which support said proof masses so that they are movable in the direction normal to said one reciprocating direction against said inner frame;
actuators for driving each of said proof masses; and
detectors for detecting displacement of said inner frame against said outer frame;

wherein said actuators oscillate said plurality of proof masses, and wherein Coriolis forces induced on each of said proof masses are summed up in said inner frame.

Preferably, the proof masses are oscillated synchronously.

In this aspect of the invention, Coriolis forces induced in each proof mass are summed up at the inner frame, and thus a large Coriolis force is achieved thereby.

In another aspect of the invention, the gyroscope comprises:

an outer frame;

an inner frame positioned inside said outer frame;

a plurality of proof masses positioned on a circle around the rotational axis of said inner frame;

a plurality of outer support suspensions which connect said outer frame and said inner frame and which support said inner frame so that it is pivotable around said rotational axis;

a plurality of inner support suspensions which connect said inner frame and each of said proof masses and which support said proof masses so that they are movable in the radial direction of said inner frame;

actuators for driving each of said proof masses; and detectors for detecting displacement of said inner frame against said outer frame;

wherein said actuators oscillate said plurality of proof masses synchronously, and wherein Coriolis forces induced on each of said proof masses are summed up in said inner frame, to generate a torsion torque in said inner frame.

In this aspect of the invention, Coriolis forces induced in each proof mass are summed up at the inner frame, large torque being achieved thereby.

Preferably, a gyroscope comprises a first layer and a second layer; and said outer frame, said inner frame and said proof masses are positioned in both of said first layer and second layer; and said outer supporting suspensions are positioned in one of said first layer and second layer, and said inner supporting suspensions are positioned in one of said first layer and second layer.

In this embodiment, the first layer may have a structure that is different from that of the second layer. Thus, it is possible to design the layers more freely than in the prior art.

Another aspect of the invention is a method for making a gyroscope which comprises: an outer frame, an inner frame, proof masses, outer support suspensions which connect said outer frame and said inner frame, and inner support suspensions which connect said inner frame and each of said proof masses. Said gyroscope is made integrally from an SOI (Silicon on Insulator) substrate which includes a silicon oxide film, a first silicon layer on one side of said silicon oxide film and a second silicon layer on the other side thereof.

The method comprising steps of:

(a) depositing a silicone oxide film on a first surface of said SOI substrate and patterning said silicone oxide film, depositing an aluminum layer on said silicone oxide film and patterning said aluminum layer, depositing an aluminum layer on a second surface of said SOI substrate and patterning said aluminum layer;

(b) etching portions that are not masked by said aluminum layer from said first surface, thereby forming a structure of the first silicone layer;

(c) removing said aluminum layer from said first surface to expose said silicone oxide film, and then etching from said first surface again, thus etching portions that are not masked by said silicone oxide film, thereby forming the structure of said first silicone layer so that movable portions are spaced from an underlying surface;

(d) etching from said second surface, thus etching portions that are not masked by said aluminum layer, thereby forming a structure of the second silicone layer; and.

(e) removing said silicone oxide film on said SOI substrate by sacrificial etching, thus separating said structures of said first and second silicone layers from said outer frame.

By this method, the SOI substrate which includes silicon oxide film and two silicon layers on both sides thereof is processed by a micro machining technique, and thus the components of the gyroscope can be arranged in two layers.

Preferably, the steps of (b), (c) and (d) are conducted by deep-reactive ion etching (DRIE) method.

A compact gyroscope having high performance and stability is obtained by the present invention.

By using a plurality of proof masses, dispersion of each proof mass is averaged, and thus a gyroscope having stable performance is obtained.

Further, because such a gyroscope is easy to manufacture, it is possible to make inexpensively.

EXPLANATION OF NUMERALS 2 support frame
4 support suspension
5 proof mass
8 rotational axis
10 gyroscope
11 outer frame
12 inner frame
12a center portion
13 outer support suspension
14 inner support suspension
15 proof mass
15a center portion
15b extension portion
16 actuator 17 detector
17a detecting electrode
18 rotational axis
19 anchor
20 gyroscope
21 silicon oxide layer
22 silicon layer
23 silicon layer
24 silicon oxide layer
25 aluminum layer
26 aluminum layer
27 metal
28 metal

DETAILED DESCRIPTION

Figure 2:
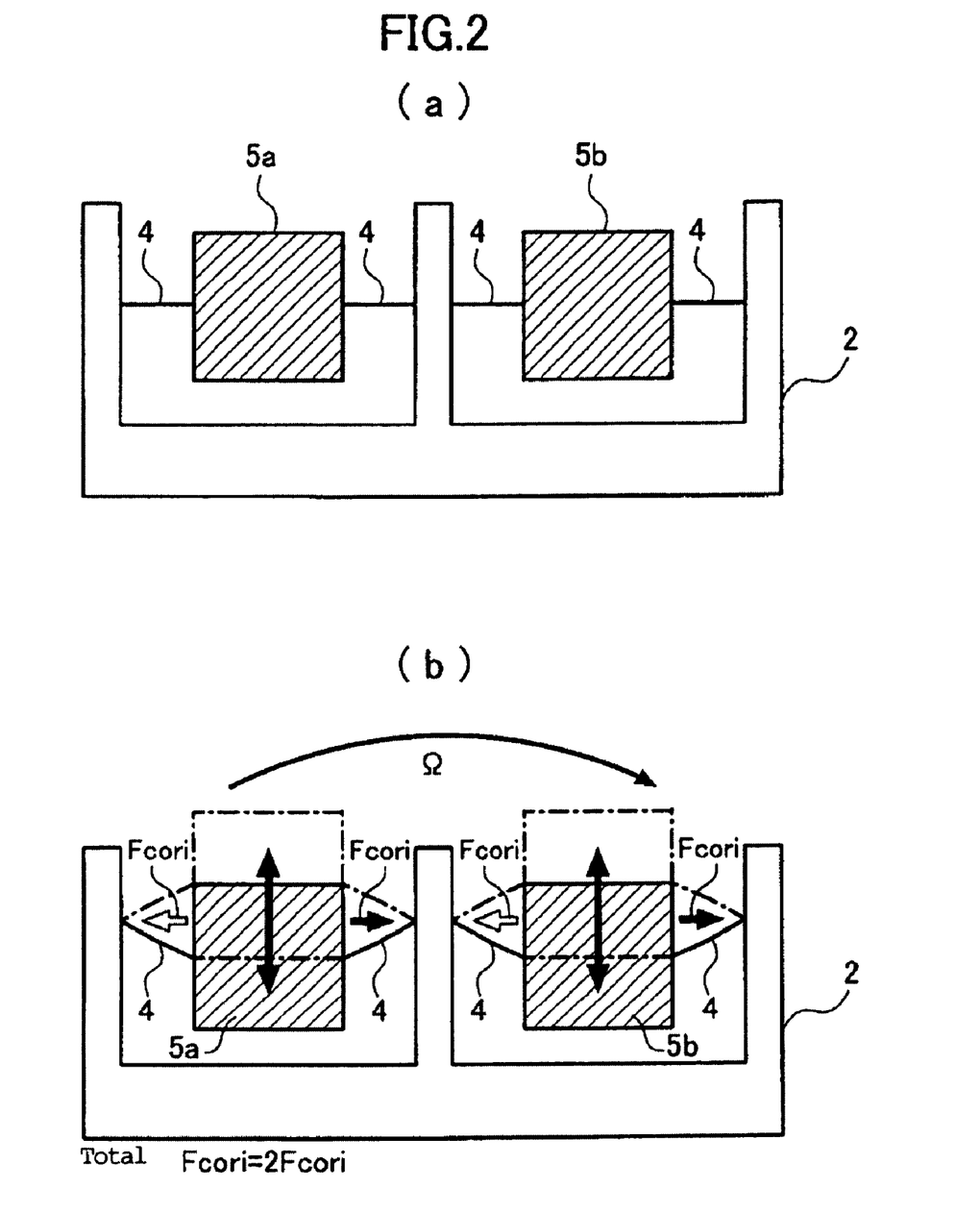
FIG. 2—A figure explaining Coriolis forces of the gyroscope which has two proof masses.

FIG. 2 illustrates Coriolis forces of a gyroscope which has two proof masses. A support suspension 4 is illustrated by a line. FIG. 2(a) illustrates an initial state of proof masses 5a,5b, and (b) illustrates a state in which the proof masses 5a,5b are oscillated in-phase and the gyroscope is rotated at angular velocity Ω. According to the equation (6), if the mass of the proof masses 5 decreases, the resonance frequency increases. Thus, if the proof masse 5 is divided into two parts, the resonance frequency increases. By oscillating each of the proof masses 5a,5b in-phase, Coriolis forces in the same direction are induced on each of the proof masses 5a,5b. When the Coriolis forces induced in the two proof masses 5a and 5b can be summed up, a Coriolis force which is larger than that achieved by driving one proof mass 5 is obtained.

Figure 3:
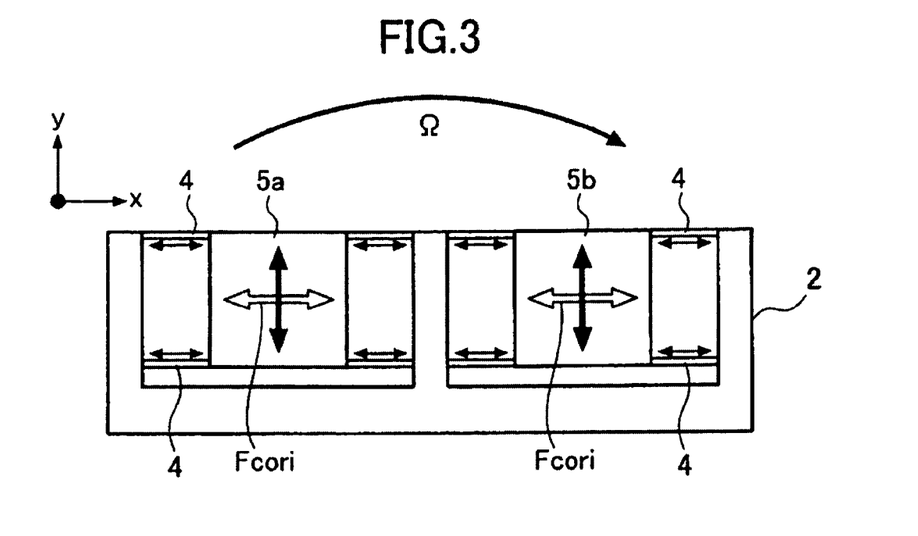
FIG. 3—A figure explaining Coriolis forces of the gyroscope which has two proof masses.

FIG. 3 also illustrates Coriolis forces of a gyroscope which has two proof masses. In FIG. 3, each of the proof masses 5a,5b is supported by two support suspensions 4, and is movable in y-direction (up and down), while it is not movable in x-direction (right and left). The proof masses 5a,5b are oscillated in y-direction, and the gyroscope is rotated with an angular velocity Ω. Then, Coriolis forces $F_{cori}$ in x-direction are induced on the proof masses 5a,5b, and Coriolis forces are transferred to a support frame 2 via the support suspensions 4. When two proof masses 5a,5b are oscillated in-phase, the Coriolis forces induced on each of the proof masses 5a,5b are in the same direction, and the Coriolis forces are summed up in the support frame 2.

Figure 4:
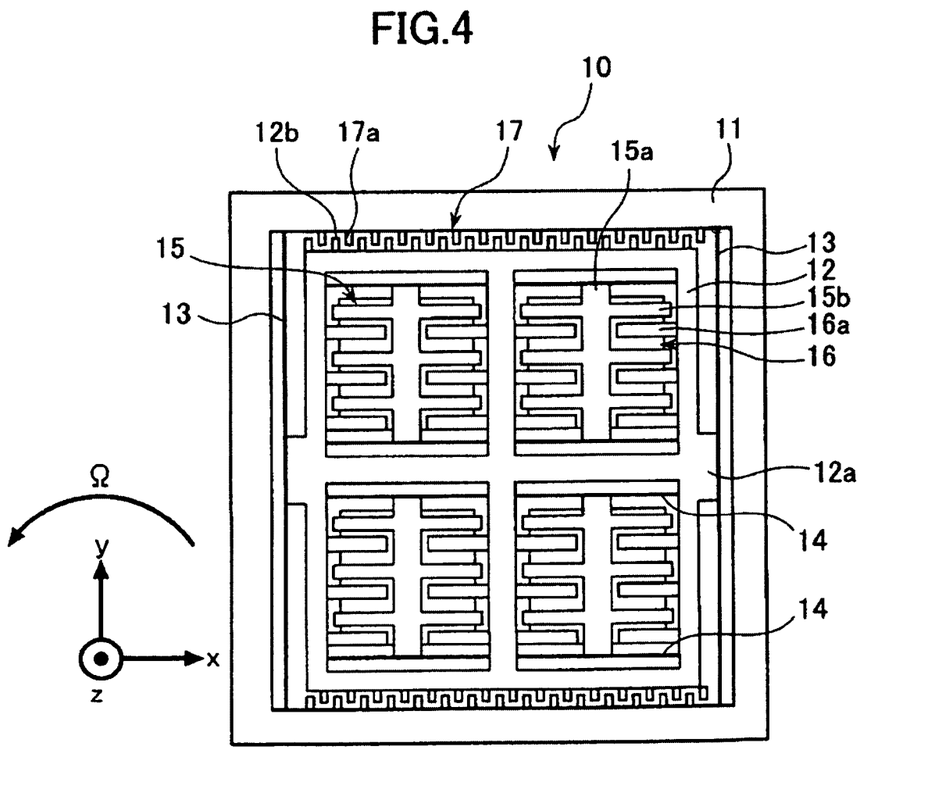
FIG. 4—A schematic plane view of the gyroscope having four proof masses according to the first embodiment of the present invention.

FIG. 4 is a schematic plane view of a gyroscope 10 having four proof masses 15 according to the first embodiment of the present invention. The gyroscope 10 is made from An SOI (Silicon on Insulator) substrate which includes a silicon oxide film and two silicon substrates on both sides thereof. The gyroscope 10 comprises an outer frame 11 which has a square cross section, and an inner frame 12 which is positioned inside the outer frame 11 and which has a square cross section. Center portions 12a of two sides in x-direction of the inner frame 12 are connected to the insides of the outer frame 11 by two outer support suspensions 13 which are parallel to y-axis. The outer support suspensions 13 are plate shaped members having thin thickness. One end of each of the outer support suspensions 13 is connected to a corresponding inner side of the outer frame 11, and the other end of each of the outer support suspensions 13 is connected to a corresponding one of the center portions 12a of the inner frame 12, and movable only in x-direction. The length of the outer support suspensions 13 in y-direction does not change, and the outer support suspensions 13 do not bend in z-direction. Thus, the inner frame 12 is movable in x-direction inside the outer frame 11. In a rest position, the inner frame 12 is positioned at a neutral position by the outer support suspensions 13.

The gyroscope 10 comprises four of the proof masses 15 inside the inner frame 12. Each of center portions 15a of two sides in y-direction of the proof masses 15 is connected to the inside of the inner frame 12 by two inner support suspensions 14 which are parallel to x-axis. The inner support suspensions 14 are plate shaped members having thin thickness. In a rest position, the proof masses 15 are positioned at a neutral position by the inner support suspensions 14.

The gyroscope 10 comprises actuators 16 for driving each proof mass 15 in y-direction. The actuator 16 is an electrostatic type actuator. That is, finger shaped electrodes 16a and extension portions 15b of the proof masses 15 are positioned alternately. The voltage is applied between the electrodes 16a and extension portions 15b, and the proof masses 15 are thus driven by electrostatic force. Other than this type of actuator, a piezoelectric type or magnetic type actuator can be used instead. The outer frame 11 has a detector 17 for detecting displacement of the inner frame 12. The detector 17 detects a change in capacitance between detecting electrodes 17a and extension portions 12b of the inner frame 12. A piezoelectric type or magnetic type detector can be used instead of this type of detector.

Each of the proof masses 15 is oscillated in-phase in y-direction in FIG. 4. The gyroscope 10 is rotated with an angular velocity Ω around z-axis. Then, Coriolis forces in x-direction are induced on the proof masses 5a,5b. Coriolis forces induced on each of the proof masses are in the same direction, and summed up at the inner frame 12, and a combined Coriolis force is generated at the inner frame 12. The inner frame 12 is displaced in x-direction, the displaced distance being in accordance with the Coriolis force and spring constant of the outer support suspension 13. By detecting the displaced distance of the inner frame 12 by the detector 17, the Coriolis force summed up at the inner frame 12 is determined.

FIG. 4 shows a gyroscope 10 having four proof masses. However, the number of the proof masses is not limited to four, and the number of the proof masses may be three or greater. In one embodiment of the invention, An SOI substrate having size of 120 mm×120 mm and thickness of 0.52 mm is used, and 7×7 proof masses are provided on the substrate.

Figure 5:
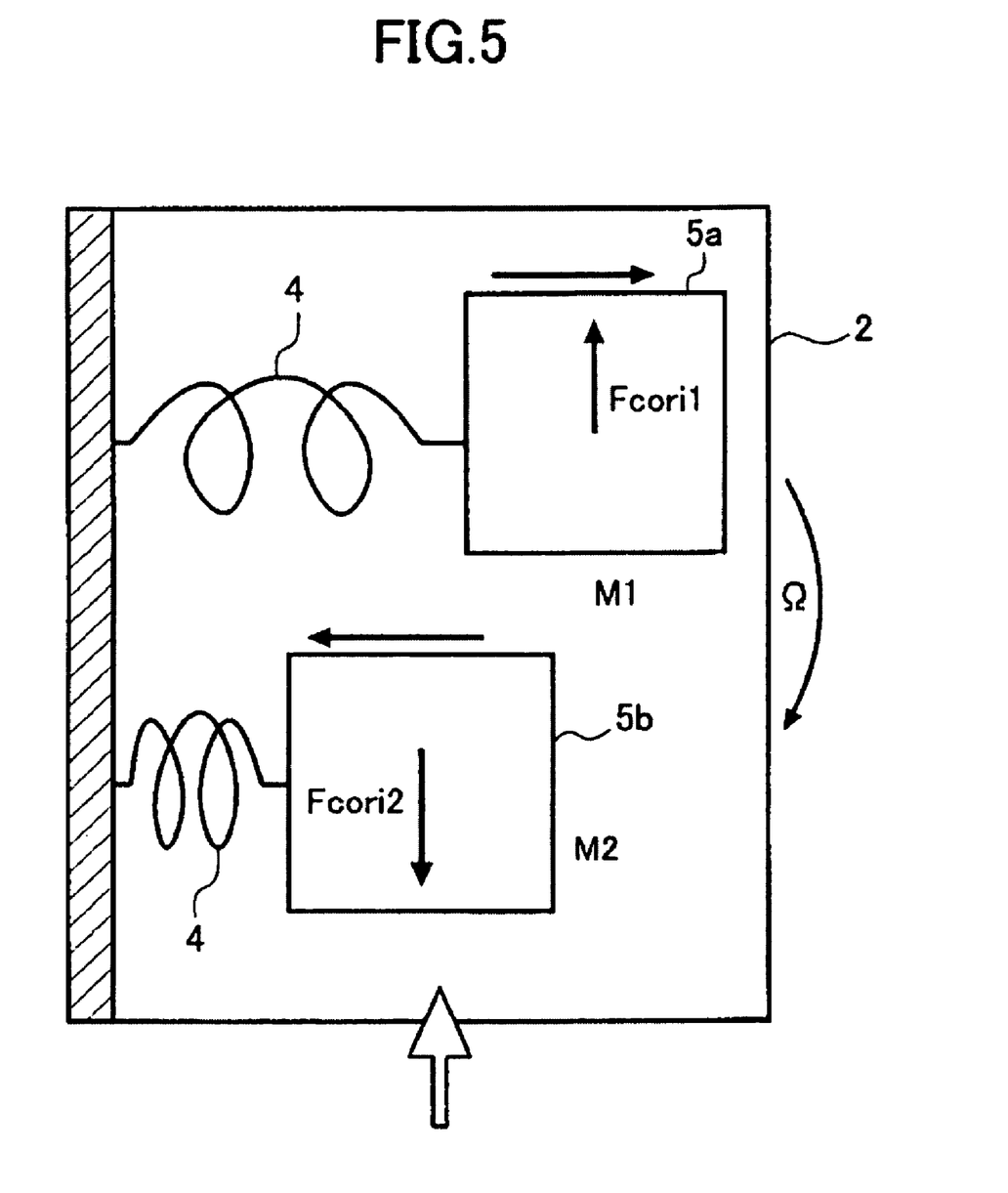
FIG. 5—A figure of the gyroscope in which two proof masses are oscillated in an anti-phase.

FIG. 5 illustrates a gyroscope in which two proof masses are oscillated in an anti-phase. A support suspension 4 is illustrated by a coil spring. In a vibratory gyroscope in which the proof masses oscillate in-phase, disturbances such as acceleration may be detected as a Coriolis force. As shown in FIG. 5, if the proof masses 5a,5b are oscillated in an anti-phase, Coriolis forces $F_{cori1}$, $F_{cori2}$ in an opposite direction are induced, and subtracting one Coriolis force from the other would eliminate the disturbance. However, in this construction, the Coriolis forces induced on the proof masses 5a,5b are in opposite direction, resulting in the Coriolis forces overriding each other, and thus they can not be summed up.

Figure 6:
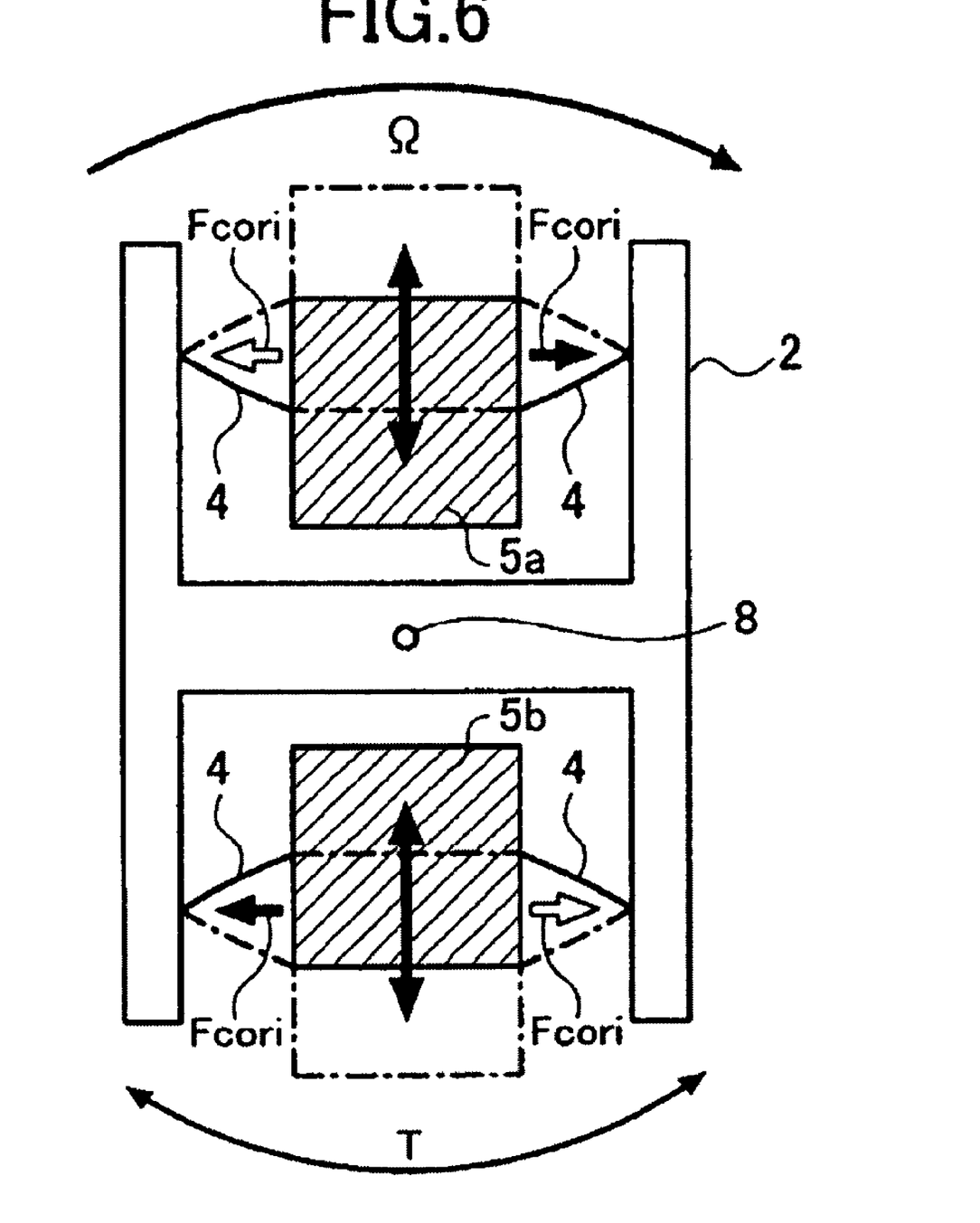
FIG. 6—A figure of the gyroscope in which two proof masses are positioned around the rotational axis and oscillated in a radial direction in an phase.

FIG. 6 illustrates a gyroscope in which two proof masses are positioned around a rotational axis 8, and oscillated in a radial direction in an anti-phase. The support suspension 4 is shown by a line. The Coriolis forces $F_{cori}$ induced on two proof masses 5a,5b are in an opposite direction, and generate torque T in the same direction around the rotational axis 8 of the support frame 2. That is, the Coriolis forces can be summed up as a torque T. Further, proof masses 5a,5b are oscillated in an anti-phase, thus can resist a disturbance.

Figure 7:
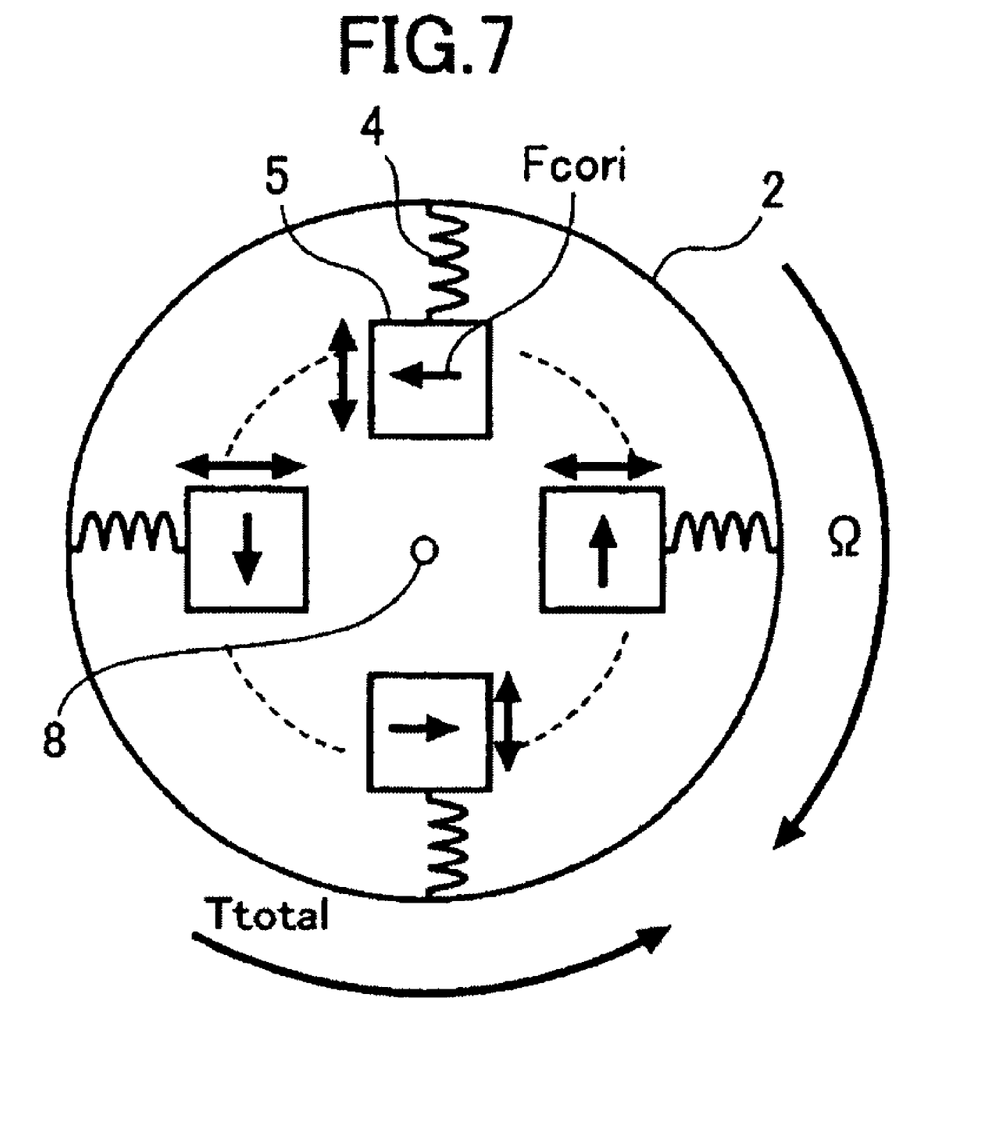
FIG. 7—A figure of the gyroscope in which four proof masses are positioned around the rotational axis and oscillated in a radial direction in-phase.

FIG. 7 illustrates a gyroscope in which a plurality of proof masses 5 (four proof masses in FIG. 7) are positioned around the rotational axis 8, and are oscillated in a radial direction in-phase. The support suspensions 4 are shown by coil springs. The proof masses 5 are oscillated synchronously, i.e., all the proof masses move outwardly in a radial direction at the same time, and move inwardly at the same time. When a support frame 2 is rotated with angular velocity Ω, Coriolis forces $F_{cori}$ induced on each proof mass 5 operate to rotate the support frame 2 around the rotational axis 8. The total torque $T_{total}$ induced on each proof mass 5 is proportional to the number of the proof masses, i.e., total mass. The total torque $T_{total}$ is converted to displacement of the support frame 2, and then converted to a change of capacitance by a detector (not shown), and thus a Coriolis force can be determined.

A plurality of proof masses are positioned on a circle and oscillated, and thus can resist a disturbance from various directions. The Coriolis forces of the proof masses can thus be summed up, resulting in high sensitivity.

Figure 8:
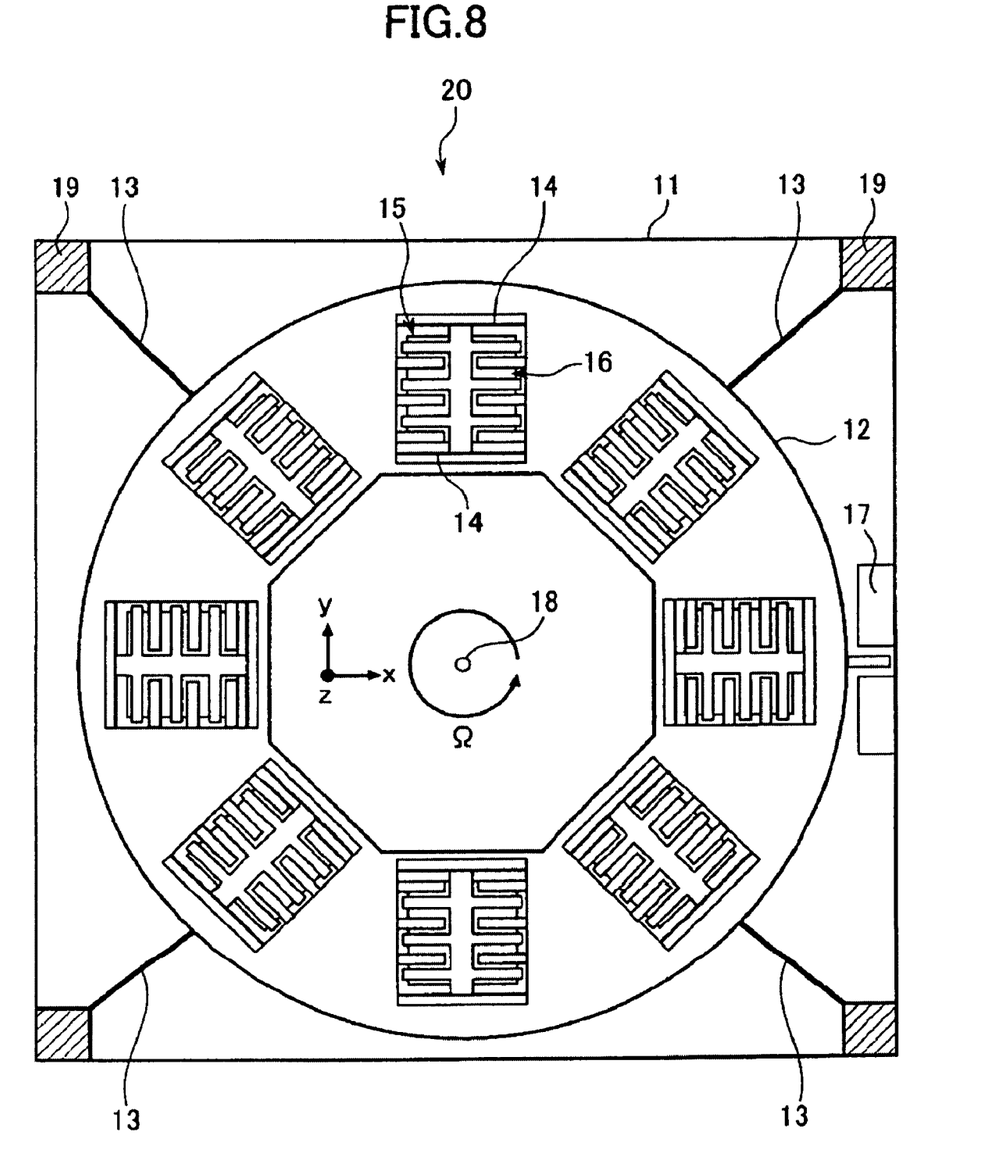
FIG. 8—A schematic plane view of the gyroscope having proof masses positioned in a circle according to the second embodiment of the present invention.

FIG. 8 is a schematic plane view of a gyroscope 20 according to the second embodiment of the present invention. In FIG. 8, parts or portions which are the same as those of FIG. 4 are shown by the same reference numerals as those in FIG. 4. As in the first embodiment, the gyroscope 20 is made from an SOI substrate. The gyroscope 20 comprises an outer frame 11 which has a square cross section and anchors 19 in the four corners of the outer frame 11. An inner frame 12, which has a square cross section, is positioned inside the outer frame 11. Each anchor 19 and the inner frame 12 is connected by an outer support suspension 13. The outer support suspensions 13 are plate shaped members having thin thickness. One end of each of the outer support suspensions 13 is connected to a corresponding one of each of the anchors 19, and the other end of each of the outer support suspensions 13 is connected to the inner frame 12, and the other end is movable only in the circumferential direction around the rotational axis 18 of the inner frame 12. The length of the outer support suspensions 13 in a radial direction of the inner frame 12 do not change, and the outer support suspensions 13 do not bend in z-direction. Thus, the inner frame 12 is supported to be movable around the rotational axis 18. In a rest position, the inner frame 12 is positioned at a neutral position by the outer support suspensions 13.

Eight proof masses 15, which have the same mass, are positioned in a circle at the same interval inside the inner frame 12. Each of two end portions of the proof masses 15 in a radial direction of the inner frame 12 is connected to the inside of the inner frame 12 by two inner support suspensions 14. The inner support suspensions 14 are plate shaped members having thin thickness. Each of the proof mass 15 is movable in a radial direction of the inner frame 12 in the inner frame 12. In a rest position, each of the proof mass 15 is positioned at a neutral position by the inner support suspensions 14.

The gyroscope 20 comprises actuators 16 for driving each proof mass 15 in a radial direction of the inner frame 12. The gyroscope 20 comprises a detector 17 for detecting rotational displacement of the inner frame 12 around the rotational axis 18. The principal of the actuator 16 and that of the detector 17 are the same as those of the first embodiment of the present invention.

Each of the proof masses 15 is oscillated in-phase in a radial direction by actuators 16 provided for each proof mass 15. That is, all the proof masses 15 are moved inwardly in the radial direction at the same time, and moved outwardly at the same time. The gyroscope 20 is rotated at angular velocity Ω. Coriolis forces in a circumferential direction of the inner frame 12 are induced on each proof mass 5 by movement of the proof mass 5. These Coriolis forces are transferred to the inner frame 12 via the inner support suspensions 14, and summed up at the inner frame 12. Rotational torque around the rotational axis 18 is generated, and thus the inner frame 12 rotates in the circumferential direction around the rotational axis 18 against the outer support frame 13. The rotational displacement of the inner frame 12 is detected by a detector 17, and thus a Coriolis force is determined.

FIG. 8 shows the gyroscope 20 having eight proof masses. However, the number of the proof masses is not limited to eight. In one embodiment of the invention, an SOI substrate having a size of 120 mm×120 mm and thickness of 0.52 mm is used, and 16 proof masses are provided in a circle on the substrate.

In a gyroscope with one proof mass, when mass m of the proof mass increases, the Coriolis force increases proportional to mass m in the order of ½. On the other hand, the distance $x_0$ that the proof mass moves is limited by the construction of the gyroscope, and thus the Coriolis force is also limited.

Each proof mass of the gyroscope with a plurality of proof masses in the present invention has a small mass. In this case, the Coriolis force induced on the proof masses is proportional to the number of the proof masses, i.e., total mass. Thus, the gyroscope with a plurality of proof masses has an advantage compared with the gyroscope having one large proof mass.

Further, when a lot of proof masses are disposed, fluctuation and noise are averaged, and thus a disturbance can be resisted. Because the gyroscope has a lot of proof masses, even if one proof mass has a defect, the gyroscope can operate, and thus it has high reliability.

Figure 9:
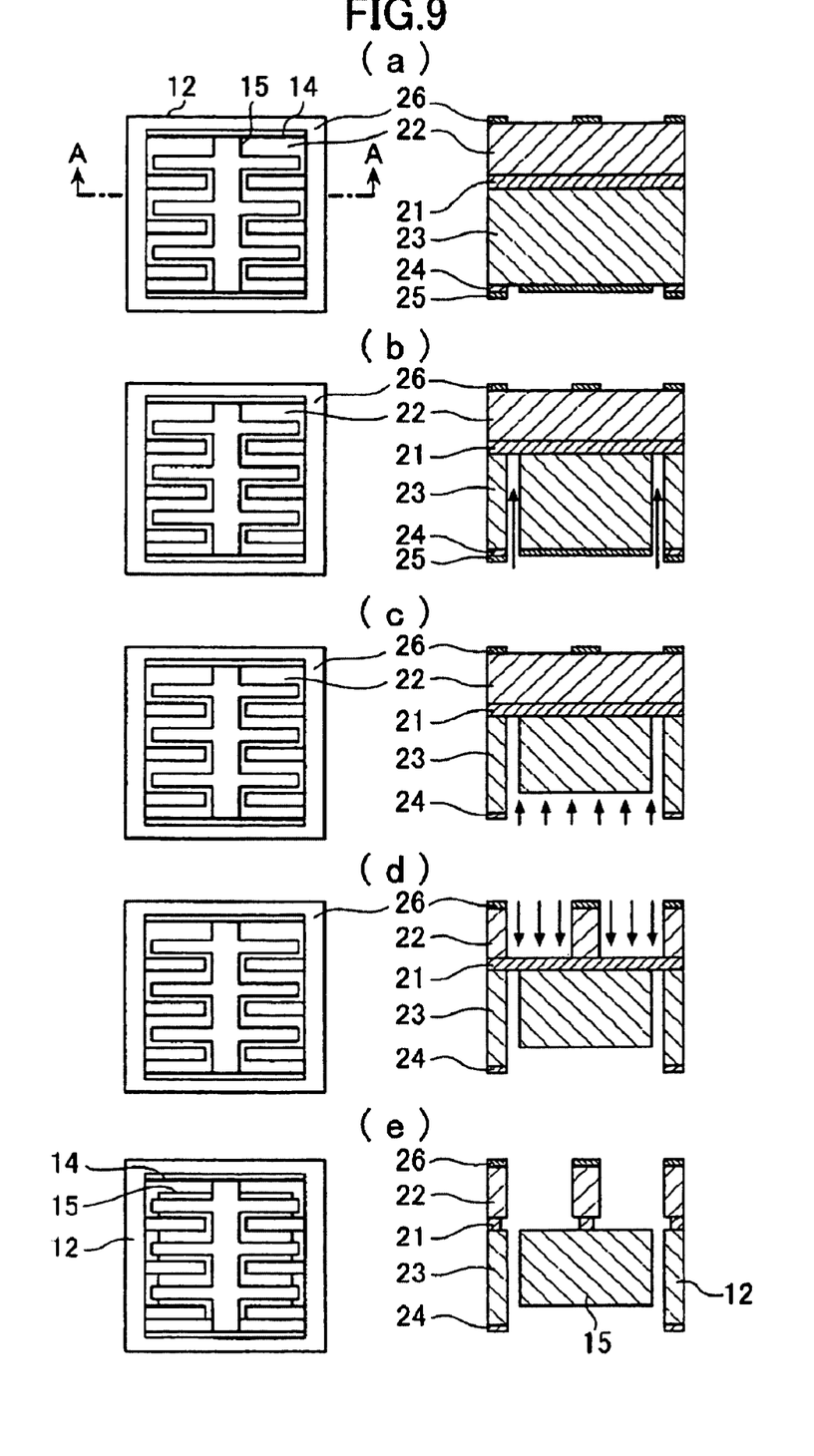
FIG. 9—Schematic plane views and cross sectional views showing steps for making the gyroscope of the embodiments of the present invention.

FIG. 9 shows steps for making the gyroscopes 10,20 of the embodiments of the present invention, the figures on the left side being plane views and the figures on the right side being cross sectional views along A-A line of the figures on the left side. In FIG. 9, the inner frame 12, the proof mass 15 and the inner support suspensions 14 are shown, while the outer frame 11 and the outer support suspensions 13 are not shown. The outer frame 11 and the outer support suspensions 13 can be formed at the same time as the inner frame 12 and the inner support suspensions 14 are formed.

(a) First, an SOI substrate is prepared. The SOI substrate comprises a silicon layer 22 on an upper side of a silicon oxide film 21 and a silicon layer 23 on a lower side thereof. In the following explanation, the two sides of the SOI substrate are named an upper side (a second side) and a lower side (a first side) in order to distinguish each side.

A silicon oxide film 24 is deposited on the lower side of the SOI substrate, and then is patterned according to a desired form using a photo-lithography technique. An aluminum layer 25 is deposited on the silicon oxide film 24, and then is patterned according to a desired form using a photo-lithography technique.

An aluminum layer 26 is deposited on the upper side of the SOI substrate, and then is patterned according to a desired form using a photo-lithography technique.

(b) Portions that are not masked by the aluminum layer 25 are etched from the lower side by deep Reactive Ion Etching (RIE), and thus a structure of the lower layer is formed in the lower silicone layer 23 (handling layer, first layer) of the SOI substrate. The structure of the lower layer includes lower portion of the proof mass 15, the inner frame 12, and the inner support suspension 14. In this step, the silicon oxide film 21 (box layer) works as an etching stop layer, and thus the silicon layer 22 on the upper side of the silicon oxide film 21 is not etched.

(c) The aluminum layer 25 (mask) on the lower side is removed, and thus the silicone oxide film 24 is exposed. Then, the SOI substrate is etched by RIE from the lower side again, and thus the portions that are not masked by the silicone oxide film 24 are etched. In this step, movable portions such as the proof mass 15 and the inner support suspensions 14 are formed so that their lower sides are spaced from an underlying surface.

(d) The upper side of the substrate is etched by deep RIE, and thus the portions that are not masked by the aluminum layer 26 are etched, thereby the upper portion of the proof mass 55 and the inner frame 12 (a structure of the upper layer) are formed in the upper silicone layer 22 (second layer) of the SOI substrate. Although it not shown, the actuator 16 and the detector 17 can be formed in the upper silicone layer in this step.

(e) The silicone oxide film 21 of the SOI substrate is etched away using sacrificial etching, and thus movable portions such as the proof mass 15, the inner frame 12 and the inner support suspension 14 are separated from the outer frame 11. By this step, the movable portions can be moved.

Figure 10:
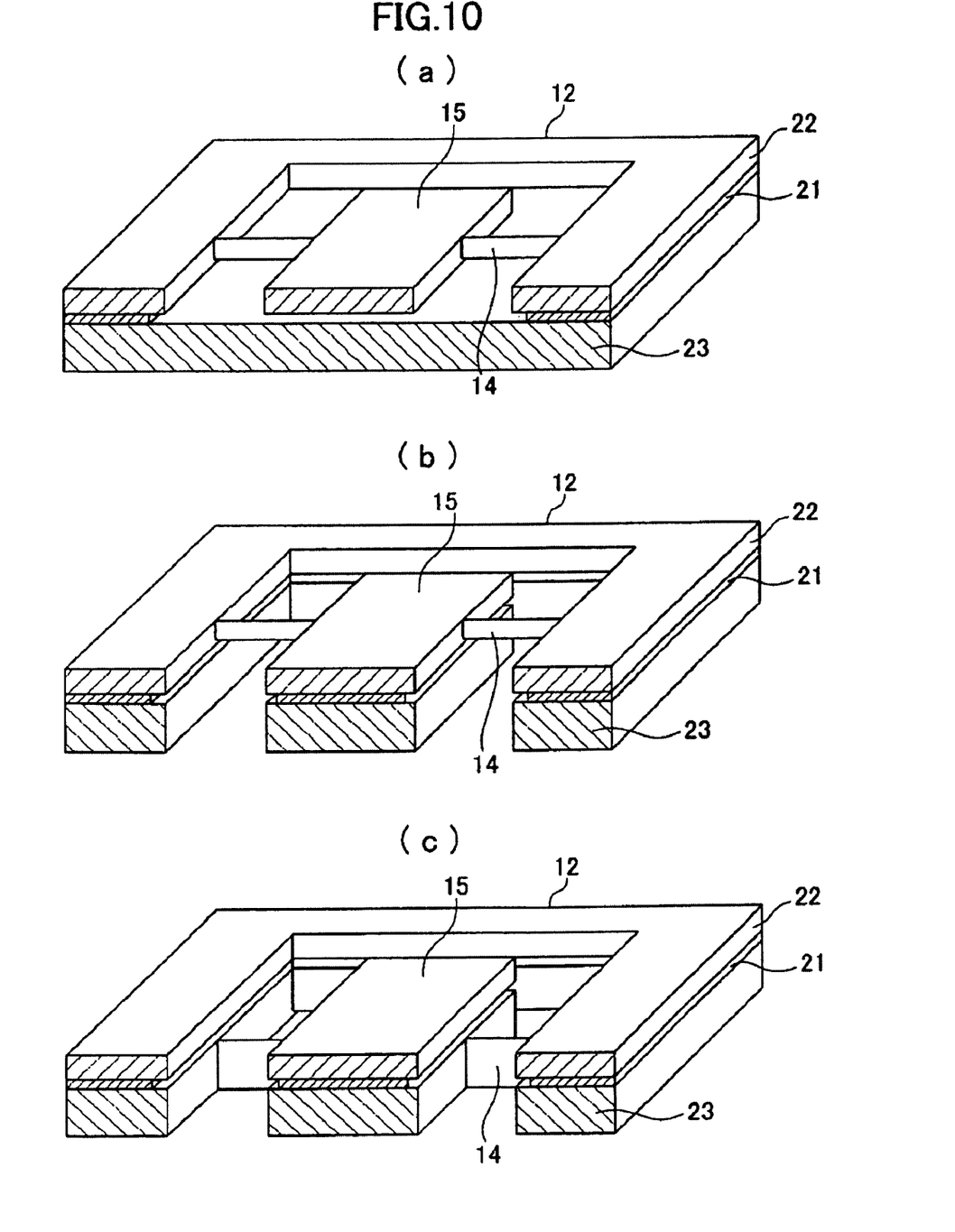
FIG. 10—A perspective view showing the structure of the gyroscope made from an SOI substrate.

FIG. 10 is a perspective view showing the structure of the gyroscope made from the SOI substrate. In FIG. 10, the inner frame 12, the proof mass 15 and the inner support suspensions 14 are shown, while the outer frame 11 and the outer support suspensions 13 are not shown. FIG. 10(a) shows a prior art gyroscope in which the structure is formed only in the upper silicon layer. In the prior art gyroscope, the structure is not formed in the lower silicon layer (handling layer).

In the present invention, the structure is formed in the upper silicon layer and lower silicone layer. FIG. 10(b) shows the structure in which the proof mass 15 is formed in both the upper and lower silicone layers 22,23, and the inner support suspensions 14 are formed in the upper silicone layer 22. FIG. 10(c) shows the structure in which the proof mass 15 is formed in both the upper and lower silicone layers 22,23, and the inner support suspensions 14 are formed in the lower silicone layer 23.

In this way, the proof mass 15 is formed in the upper and lower silicon layers 22,23, and thus the mass of the proof mass 15 is increased. Further, the inner frame 12 is formed in both the upper and lower silicon layers 22,23, and thus the strength of the inner frame 12 is increased. The inner support suspensions 14 can be formed in one of the upper and lower silicon layers 22,23, and thus restrictions on design are decreased.

Further, there is the silicon oxide layer 21, which works as an insulating layer, between the upper and lower silicon layers. Thus the upper silicon layer 22 and the lower silicon layer 23 are isolated from each other, and thus the structure can have a complicated wiring.

Figure 11:
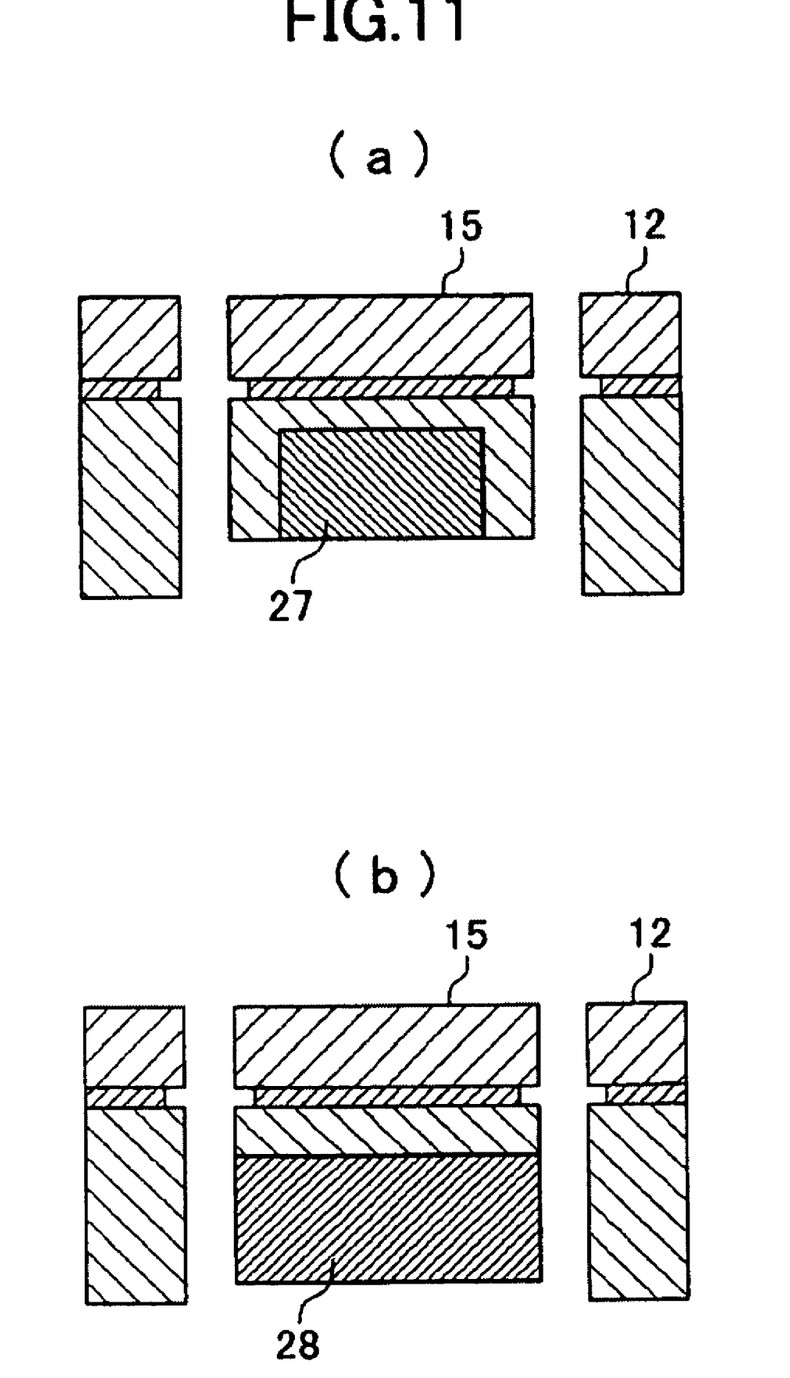
FIG. 11—A cross sectional view of an embodiment in which the proof masses have metal layers.

FIG. 11 shows a cross sectional view of an embodiment in which the proof mass has metal layers. FIG. 11(a) shows that a metal 27 is embedded in the proof mass by a method such as plating. FIG. 11(b) shows that a metal 28 having high gravity, such as lead or tin, is applied to the proof mass. In this way, the mass of the proof mass is increased to attain a large Coriolis force.

INDUSTRIAL APPLICABILITY

According to the present invention, a compact and high performance gyroscope is obtained. Thus, a compact and high precision attitude control system is realized, which can be used in a probe in space. The gyroscope can also be used in an anti blurring device for a camera and in sensors for game machines.

What is claimed is:

1. A gyroscope comprising:
an outer frame;
an inner frame positioned inside said outer frame;
a plurality of proof masses positioned inside said inner frame;
a plurality of outer support suspensions which connect said outer frame and said inner frame and which support said inner frame so that said inner frame is movable in one reciprocating direction against said outer frame;
a plurality of inner support suspensions which connect said inner frame and each of said proof masses and which support said proof masses so that said proof masses are movable in a direction normal to said one reciprocating direction against said inner frame;
actuators for driving each of said proof masses; and
detectors for detecting displacement of said inner frame against said outer frame;
wherein said actuators oscillate said plurality of proof masses, and wherein Coriolis forces induced on each of said proof masses are summed up in said inner frame.

2. A gyroscope comprising:
an outer frame;
an inner frame positioned inside said outer frame;
a plurality of proof masses positioned on a circle around a rotational axis of said inner frame;
a plurality of outer support suspensions which connect said outer frame and said inner frame and which support said inner frame so that said inner frame is pivotable around said rotational axis;
a plurality of inner support suspensions which connect said inner frame and each of said proof masses and which support said proof masses so that said proof masses are movable in a radial direction of said inner frame;
actuators for driving each of said proof masses; and
detectors for detecting displacement of said inner frame against said outer frame;
wherein said actuators oscillate said plurality of proof masses synchronously, and wherein Coriolis forces induced on each of said proof masses are summed up in said inner frame, to generate a torsion torque in said inner frame.

3. A gyroscope according to claim 1 comprising;
a first silicone layer and a second silicone layer; and
wherein said outer frame, said inner frame and said proof masses are positioned in both of said first and second silicone layers; and
said outer support suspensions are positioned in one of said first and second silicone layers, and said inner support suspensions are positioned in one of said first and second silicone layers.

* * * * *